Jan. 12, 1932.   F. G. WILLIAMS   1,841,234
FREE WHEELING DEVICE
Filed Oct. 6, 1930   2 Sheets-Sheet 1

Inventor
F. G. Williams
By Clarence A. O'Brien
Attorney

Jan. 12, 1932. F. G. WILLIAMS 1,841,234
FREE WHEELING DEVICE
Filed Oct. 6, 1930 2 Sheets-Sheet 2
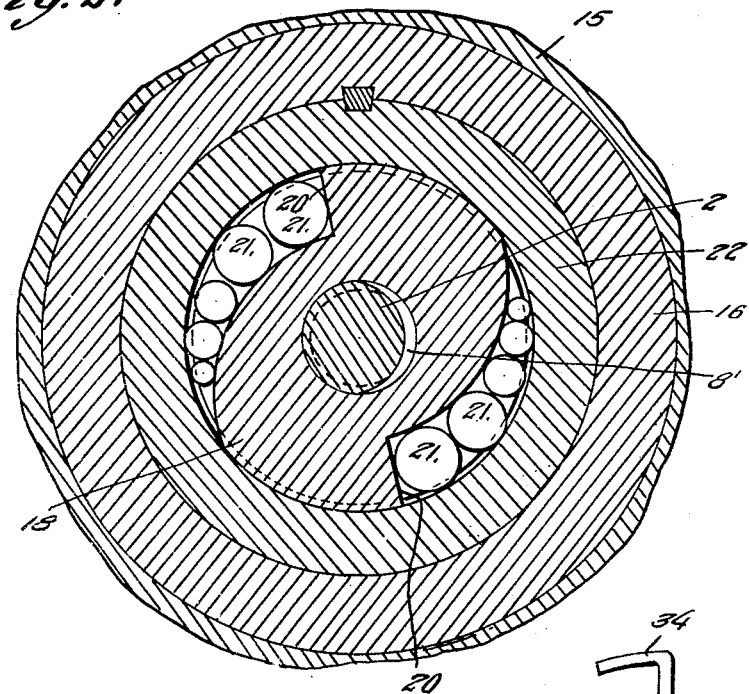
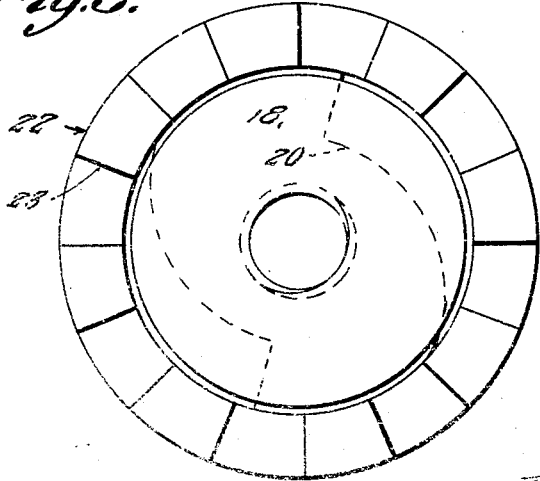
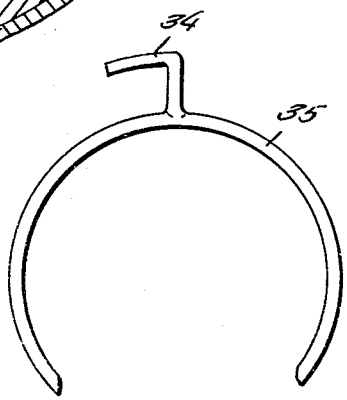
Inventor
F. G. Williams
By Clarence A. O'Brien
Attorney Patented Jan. 12, 1932

1,841,234

UNITED STATES PATENT OFFICE

FLOYD G. WILLIAMS, OF JACKSON, MICHIGAN

FREE WHEELING DEVICE

Application filed October 6, 1930. Serial No. 486,782.

This invention relates to a free wheeling device for automotive vehicles, and has for one of its important objects to provide, in a manner as hereinafter set forth, a free wheeling device which is entirely enclosed in the hub of the vehicle drive wheel, it being understood, of course, that one of the devices is provided in each drive wheel.

Other objects of the invention are to provide a free wheeling device of the character described which will be simple in construction, strong, durable, efficient in operation and which may be manufactured at low cost.

All of the foregoing and still further objects and advantages of the invention may become apparent from a study of the following specification, taken in connection with the accompanying drawings wherein like characters of reference designate corresponding parts throughout the several views, and wherein:—

Figure 2 is a vertical transverse sectional view taken substantially on the line 2—2 of Figure 1 looking in the direction of the arrows.

Figure 3 is a detail view in elevation of one of the one way clutches.

Figure 4 is a detail view in elevation of the resilient yoke which frictionally engages the screw actuated clutch disk for yieldingly connecting the retaining spring thereto.

Figure 1:
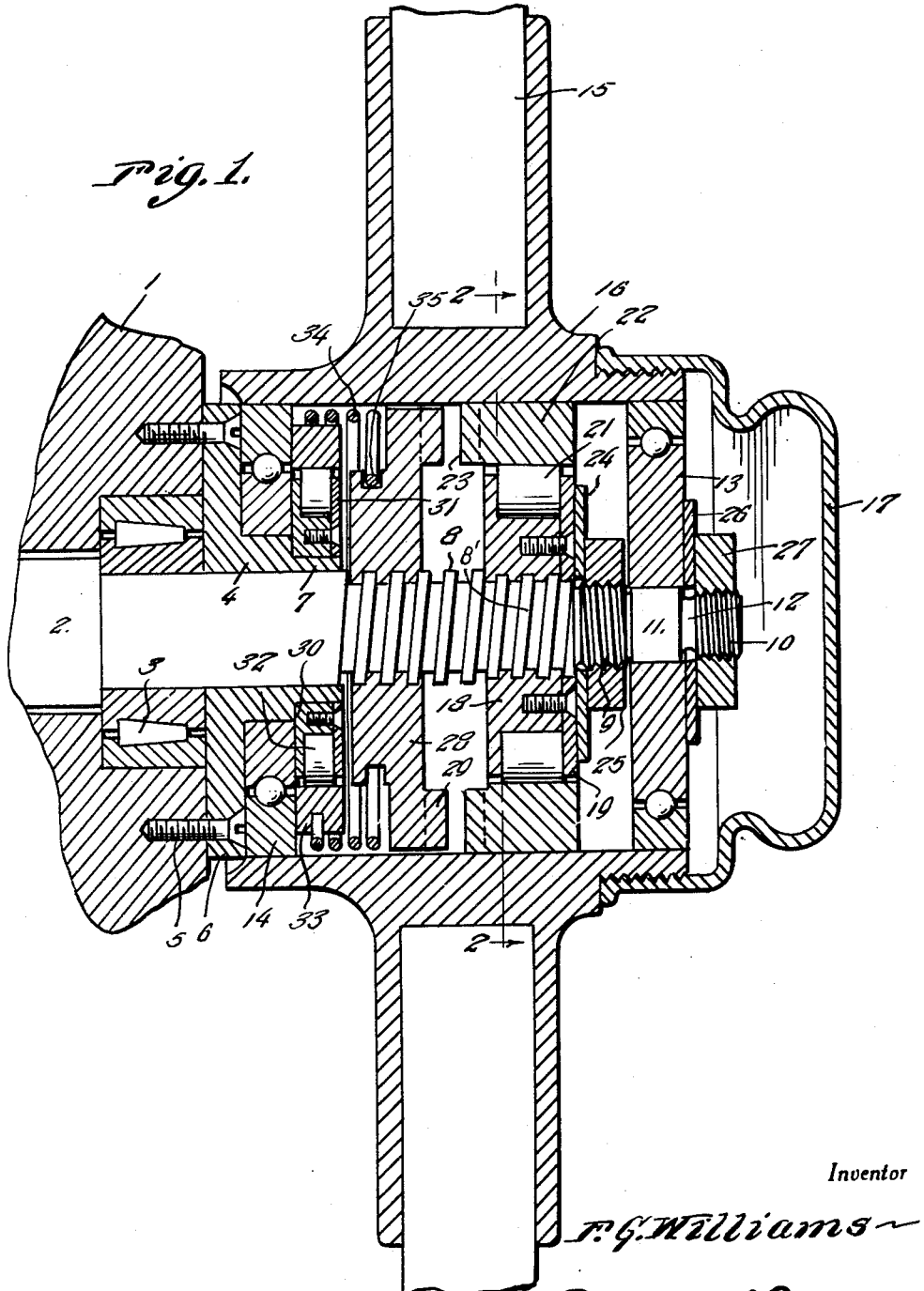
Figure 1 is a view in vertical longitudinal section of a device constructed in accordance with this invention.

Referring to the drawings in detail, it will be seen that the reference numeral 1 designates an end portion of an axle housing from which extends for rotation the axle 2 which is journaled in a suitable roller bearing 3 provided therefor in the housing 1. A stationary sleeve 4 encircles the axle 2 and is secured to the adjacent end of the housing 1 by screws 5 which extend through the integral apertured flange 6 on the sleeve 4. The free end portion of the sleeve 4 is provided with an integral reduced extension 7.

Outwardly of the free end of the sleeve 4 the axle 2 is provided with spirally threaded portions 8 and 8', the thread on the portion 8' being of less circumference than that on the portion 8. The axle 2 is further provided with a reduced threaded portion 9 which is oppositely threaded with respect to the spirally threaded portions 8 and 8'. A reduced threaded free end portion 10 is connected to the threaded portion 9 by an unthreaded portion 11 and an annular groove or channel 12 is provided between the portions 10 and 11. Anti-friction bearings 13 and 14 are mounted on the unthreaded portion 11 of the axle 2 and on the sleeve 4 in abutting engagement with the flange 6 and constitute means for journalling the wheel 15 on the axle 2. Said wheel 15 has a hub portion 16 upon which is threaded a hub cap 17. A clutch disk 18 is fixed on the spirally threaded portion 8' of the axle 2 adjacent the threaded portion 8 of said axle and the clutch disk 18 is adapted for rotation with the axle at all times. A flat plate 19 is secured by suitable means such as screws to the outer side of the clutch disk 18 and said plate constitutes the outer side walls of the cam pockets or recesses 20 which are provided in diametrically opposite sides of the clutch disk 18. Clutch rollers 21 are provided in each of the cam pockets or recesses 20 for operative engagement with the clutch ring 22 which is fixed in the wheel hub 16 for rotation therewith and which encircles the clutch disk 18. Clutch teeth 23 are provided on the inner side of the clutch ring 22. A washer 24 is clamped against the plate 19 by a nut 25 which is threaded on the portion 9 of the axle 2. The clutch disk 18 is threaded on the thread 8' until stopped by the comparatively large thread 8 and is secured against retrograde movement by the nut 25. A washer 26 is clamped against the outer side of the bearing 13 by the retaining nut 27 which is threaded on the portion 10 of the axle 2. A clutch disk 28 is threaded for longitudinal movement on the spirally threaded portion 8 of the axle 2 between the clutch disk 18 and the sleeve 4 and said clutch disk 28 is provided with the clutch teeth 29 for engagement with the teeth 23 in a manner to operatively connect the clutch ring 22 to the axle 2 when the vehicle is to be moved backwards and the direction of rotation of the axle 2 is reversed.

On the side opposite that on which the teeth 29 are provided the clutch disk 28 is provided with a circumferentially channeled shoulder, as best seen in Figure 1 of the drawings. A clutch ring 30 is fixed on the reduced extension 7 in any suitable manner and has secured on the face thereof which is adjacent the clutch disk 28 a plate 31 which constitutes one of the side walls of the cam pockets or recesses provided in diametrically opposite sides of the ring 30 for the reception of the clutch rollers 32. The clutch rollers 32 are for operative engagement with a clutch ring 33 which encircles the ring 30 and has its outer periphery spaced inwardly from the interior of the hub 16. A coil spring 34 has one end anchored to the clutch ring 33 and secured to the other end of the spring 34 is a resilient retaining yoke 35 which is disposed in the channel of the shoulder provided therefor on the clutch disk 28 for frictionally connecting the spring 34 with the clutch disk 28. It may be well to here state that the cam pockets or recesses in the clutch disk 18 and the clutch ring 30 are disposed oppositely with respect to each other in order that the rollers 21 will function when the axle 2 is rotated in one direction and the rollers 32 will function when the axle 2 is rotated in the opposite direction.

In operation when the vehicle is being driven forwardly, the axle 2 is rotated in a corresponding direction and drives the fixed clutch disk 18. The clutch disk 18 is operatively coupled to the clutch ring 22 by the rollers 21 and in this manner the wheel 15 is driven in a forward direction. It will be apparent that when the wheel has a tendency to turn faster than the axle 2, as when the vehicle is traveling down grade or when the engine of the vehicle is decelerated, the clutch rollers 21 will permit independent rotation of the wheel 15 when traveling forwardly under such conditions. This permits the engine of the vehicle to operate at throttling speed regardless of the speed at which the vehicle may be traveling.

Should it be desired to drive the vehicle rearwardly, this is accomplished by reason of the fact that the clutch disk 28 will start to rotate with the axle 2 when the direction of rotation of said axle 2 is reversed and the spring 34 which is frictionally connected to the clutch disk 28 by the yoke 35 will rotate the clutch ring 33 in a reverse direction until engaged and retained against rotation by the clutch rollers 32. In this manner the clutch disk 28 will be yieldingly retained against rotation and will consequently be threaded toward the clutch disk 18 by the continued rotation of the axle 2. When the clutch teeth 29 on the clutch disk 28 engage with the clutch teeth 23 on the clutch ring 22, said clutch ring will be operatively connected to the axle 2 for actuation by said axle and the wheel 15 is thus driven in a reverse direction. This operation winds the spring 34 and when the vehicle is again driven forwardly, said spring 34 rotates the clutch disk 28 on the axle 2 in a manner to thread said clutch disk 28 away from and out of engagement with the clutch ring 22.

It is believed that the many advantages of a free wheeling device constructed in accordance with this invention will be readily understood, and although the preferred embodiment of the invention is as illustrated and described, it is to be understood that changes in the details of construction may be had which will fall within the scope of the invention as claimed.

What is claimed is:—

1. In a free wheeling device, an axle a driven wheel journaled on the axle, clutch means operatively connecting the wheel to the axle for actuation thereby in one direction, a clutch member threaded on the axle and engageable with the wheel for actuating said wheel in the opposite direction, and resilient means operatively connected with the clutch member for yieldingly retaining same against rotation during initial rotary movement of the axle in said opposite direction for threading said clutch member toward operative position on the axle.

2. In a free wheeling device, a driving axle having a threaded portion, a driven wheel journaled on the axle, clutch means operatively connecting the wheel to the axle for actuation thereby in one direction, a clutch member threaded on the axle and engageable with the wheel for actuating said wheel in the opposite direction, and resilient means operatively connected with the clutch member for yieldingly retaining same against rotation during initial rotary movement of the axle in said opposite direction for threading said clutch member toward operative position on the axle, the resilient means including a coil spring, means frictionally connecting one end of the coil spring to the clutch member, and a one-way brake for connecting the other end of the coil spring to a fixed object for retaining said spring against rotation in said opposite direction.

In testimony whereof I affix my signature.

FLOYD G. WILLIAMS.